Patented Nov. 21, 1950

2,531,280

UNITED STATES PATENT OFFICE 2,531,280

ALKYLATION OF THIOPHENE COMPOUNDS

Kenneth L. Kreuz, Beacon, N. Y., assignor to The Texas Company, New York, N. Y., a corporation of Delaware No Drawing. Application March 21, 1946, Serial No. 656,160

4 Claims. (Cl. 260—329)

This invention relates to a process for the production of acyclic substituted thiophene compounds and particularly to a method of alkylating thiophene and its derivatives.

The preparation of alkyl-substituted thiophene compounds has previously been primarily of academic interest, and the methods employed in the preparation of such compounds have been adaptable solely to the production of small batch preparation. A summary of these methods of preparation are found in W. Steinkopf's "Die Chemie des Thiophens."

The principal methods of preparing alkyl thiophene homologs are the classical Fittig's Synthesis involving condensation of a thiophene halide with an alkyl halide and metallic sodium in the presence of ether, and the Clemmensen Reduction involving the reduction of ketone derivatives of thiophene with amalgamated zinc and hydrochloric acid. These reactions, although applicable to the preparation of a number of alkyl derivatives of thiophene, possess definite limitations both in flexibility of charge stocks and yields of end products, which restrict their use to small scale laboratory preparations. Furthermore, these types of reactions require, as charge compounds, specific classes of thiophene derivatives which contain selected polar groups in the positions in which alkylation or the formation of alkyl radicals are to be effected. These and other inherent disadvantages of the prior methods of alkylating thiophene compounds are overcome by the alkylation process of the present invention.

It has been discovered that acyclic substituted thiophene compounds may be prepared by vapor phase contact of a thiophene compound possessing at least one reactive hydrogen atom with an alkylating agent containing at least three carbon atoms in the presence of an acid-reacting solid. As distinguished from the aforementioned prior methods of alkylation, the thiophene charge compounds adaptable to direct alkylation by the subject process are those which contain a thiophene nucleus in the molecule and at least one reactive hydrogen atom in the thiophene nucleus. Such thiophene compounds include the substituted as well as the unsubstituted thiophene, together with the polynuclear and condensed thiophene compounds. The alkylation is effected in the position of one or more of the reactive hydrogen atoms, depending upon the mol ratios of alkylating agent to thiophene and the conditions of reaction.

When referring to the reactive hydrogen atoms of the thiophene nucleus in the description and claims of the invention, it is to be understood that reference is made to those hydrogen atoms of the nucleus which are capable of substitution by an alkyl or acyclic radical. This distinction is necessary only in the case of the substituted thiophene compounds and particularly such compounds as are substituted by strongly negative radicals, e. g. $NO_2$, COOH, etc. As a general proposition the hydrogen atoms adjacent the heterocyclic sulfur, namely in the 2 and 5 positions, are the most reactive hydrogens and accordingly the initial alkylation is preferentially effected in these positions unless blocked by the presence of negative substituents in the molecule.

The alkylating agents contemplated in the process of the invention are the acyclic compounds containing at least three carbon atoms which are capable of providing a reactive olefinic bond under the conditions of reaction. Such compounds include the acyclic olefins, diolefins, alcohols, ethers and esters. In the preferred embodiment of the invention preference is given to the use of olefins as the alkylating agent. These olefins may be any of the normally gaseous or normally liquid olefins or mixtures thereof containing at least three carbon atoms in the molecule as, for example, propylene, butylenes, amylenes, $C_4$ polymers, such as di-isobutylene and tri-isobutylene, cross-polymers of isobutylene and normal butylene, mixed or non-selective $C_3$-$C_4$ polymers and various fractions of thermally or catalytically cracked gasoline or polymer naphthas, etc. However, the invention is not restricted to the olefins as alkylating charge stocks. Besides the di-olefins, such as butadiene, other compounds which, under the reaction conditions, will yield a reactive olefinic bond, may be used. As examples thereof may be mentioned the alcohols, such as isopropanol, tertiary butanol, secondary butanol, cyclohexanol; ethers such as isopropyl ether; and the acyclic esters, such as the alkyl halides.

In effecting the alkylating reaction, the alkylating agent and the thiophene compound are brought into vapor phase contact with an acid-reacting solid catalyst. As the description implies, the catalysts employed are those containing an acid or an acid-reacting component as the primary catalytic constituent. These catalysts include the acid catalysts, such as phosphoric acid impregnated kieselguhr, etc., and the hydrogels composed of oxides of amphoteric metals and/or acid anhydrides, such as silica, alumina, chromia, molybdena, acid-treated clays, etc. The majority of the catalysts falling within the scope of the invention have previously been recognized as efficacious in other catalytic processes and accordingly their methods of preparation follow the practice of the art. The form of the catalyst will depend upon the type of operation and reactor used. The process itself may be conducted in accordance with any of the conventional catalytic vapor phase conversion operations such as fluid, moving fixed bed, fluidized-fixed bed, and fixed bed types of operation. Thus, the catalyst may be employed in powder, granular, bead or pellet form as dictated by the choice of operation.

In carrying out the process the thiophene compound and the alkylating agent may be separately vaporized and preheated, or they may be mixed either before or after vaporizing and the mixed vapors then preheated to a temperature slightly below the reaction temperature. This preparation of the charge stocks may be accomplished either in separate preheater units or may be carried out in a reaction vessel in which the first portion of the catalyst chamber serves as the preheater.

The particular conditions of reaction in the process designed to produce the optimum yields of the desired alkylate will vary with the specific charge stocks, catalyst, and the type of operation employed. In general, the reaction should be conducted at reaction pressures not greater than about 100 pounds per square inch. When describing the pressures in terms of pounds per square inch throughout the specification and claims, such pressures are to be understood as gauge pressures and not absolute pressures. In the $C_3$ or propylation reactions, the optimum pressures usually range slightly in excess of atmospheric pressure, e. g. 30–80 pounds per square inch, whereas reactions involving the higher molecular weight alkylating agents are best conducted at atmospheric pressure. These conditions are predicated upon the absence of substantial amounts of diluents in the reaction and it is to be understood that if inert diluents are present in the reaction mixture, the reaction may be conducted at increased pressures.

The reaction temperature will normally vary within the range of about 400–900° F., although it is preferable to operate at temperatures of about 600–700° F. The ratio of thiophene compound to alkylating agent charged may range from approximately 0.2 to 10 and, preferably, from 1 to 4. The space velocity (total liquid volumes of charge per volume of catalyst per hour) employed may also vary over a considerable range, e. g. 0.2 to 5, although the majority of reactions will proceed satisfactorily at space velocities from 1 to 2. All the specific or optimum conditions of reaction previously mentioned are predicated upon a fixed bed catalyst operation and slight variations in optimum conditions may be expected with processes involving other types of conversion operations.

In order that the invention may be fully understood, reference is made to the following specific examples to illustrate the specific methods of practicing the invention in the fixed bed type of operation. It is to be understood that these examples are presented for illustrative purposes only and are not intended as limitations of the invention.

Example I

A mixture of propylene and thiophene in a mol ratio of 3 mols of thiophene per mol of propylene were vaporized in a preheater and charged to a catalytic reaction tube maintained at substantially atmospheric pressure. The reaction zone was filled with a phosphoric acid on kieselguhr catalyst and was maintained at an average temperature of 700° F. The reactants were charged at a total liquid space velocity of about 1.9 v./v./hr. for a period of 1.7 hours. The isopropylthiophene recovered represented a yield of 17 mol per cent on the basis of the propylene charge and 45 mol per cent on the basis of the thiophene consumed.

Example II

The process of Example I was repeated under the same conditions except that the average temperature in the reaction zone was maintained at about 720° F. and the pressure in the reaction tube was raised to 50 pounds per square inch. The isopropylthiophene recovered represented a yield of 48 mol per cent on the basis of the propylene charge and 51 mol per cent on the basis of the thiophene consumed.

Example III

A vaporized mixture of propylene and thiophene in a mol ratio of 4.1 mols of thiophene per mol of propylene was charged to a reaction zone filled with a commercial silica-alumina-zirconia catalyst (88% $SiO_2$, 10% $Al_2O_3$, 2% $ZrO_2$), which was maintained at an average temperature of 550° F. and a pressure of about 100 pounds per square inch. The total liquid space velocity was 2.4 v./v./hr. The isopropylthiophene recovered represented a yield of 26 mol per cent on the basis of the propylene charge and 39 mol per cent on the basis of the thiophene consumed.

Obviously many modifications and variations of the invention, as hereinbefore set forth, may be made without departing from the spirit and scope thereof and, therefore, only such limitations should be imposed as are indicated in the appended claims.

I claim:

1. A continuous process for producing nuclear alkylated thiophene compounds, which comprises reacting a thiophene compound containing one reactive nuclear hydrogen atom with an unsaturated acyclic compound containing at least three carbon atoms in the vapor phase in the presence of an acid-reacting solid catalyst at a temperature between 400 and 900° F. and at pressures less than about 100 pounds per square inch and at a space velocity of 0.2 to 5 volumes of liquid charge per volume of catalyst per hour.

2. A continuous process for producing acyclic nuclear substituted thiophene compounds which comprises contacting in the vapor phase a thiophene compound containing at least one reactive nuclear hydrogen atom and an alkylating agent containing at least three carbon atoms with an acid-reacting solid catalyst at pressures between about 50 and 80 pounds per square inch at a space velocity of 0.2 to 5 liquid volumes of charge per volume of catalyst per hour and at a temperature between about 600 and 900° F.

3. A continuous process for producing acyclic nuclear substituted thiophene compounds which comprises contacting in the vapor phase a thiophene compound containing at least one reactive nuclear hydrogen atom and an alkylating agent containing at least three carbon atoms with a solid catalyst selected from the group consisting of the oxides of amphoteric metals at pressures less than about 100 pounds per square inch at a space velocity of 0.2 to 5 volumes of liquid charge per volume of catalyst per hour and at temperatures in the range of about 400 to 900° F.

4. A continuous process for producing an isopropyl thiophene derivative which comprises contacting in the vapor phase a thiophene compound containing at least one reactive nuclear hydrogen atom and propylene with an acid-reacting solid catalyst at a pressure between about 30 and 80 pounds per square inch at a space velocity of 0.2 to 5 volumes of liquid charge per volume of catalyst per hour and at a temperature between about 600 to 900° F.

KENNETH L. KREUZ.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,405,874 | Bullard | Aug. 13, 1946 |
| 2,448,211 | Caesar | Aug. 31, 1948 |

OTHER REFERENCES

Richter: "Organic Chemistry," pages 649–650. John Wiley, N. Y., Publ., 1938.